(12) United States Patent
Chen et al.

(10) Patent No.: US 12,430,231 B2
(45) Date of Patent: Sep. 30, 2025

(54) METHOD, DEVICE, AND COMPUTER PROGRAM PRODUCT FOR GENERATING TEST CASE

(71) Applicant: Dell Products L.P., Round Rock, TX (US)

(72) Inventors: Chi Chen, Chengdu (CN); Nan Wang, Chengdu (CN); Jing Ye, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 18/138,886

(22) Filed: Apr. 25, 2023

(65) Prior Publication Data

US 2024/0134780 A1  Apr. 25, 2024
US 2024/0232058 A9  Jul. 11, 2024

(30) Foreign Application Priority Data

Oct. 20, 2022 (CN) .......................... 202211288156.5

(51) Int. Cl.
*G06F 11/3668* (2025.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 11,823,133 B1 | 11/2023 | Bammi et al. | |
| 2006/0195732 A1* | 8/2006 | Deutschle | G06F 11/3688 714/724 |
| 2007/0162894 A1* | 7/2007 | Noller | G06F 11/3688 717/124 |
| 2009/0222696 A1* | 9/2009 | Duale | G06F 11/263 714/E11.001 |
| 2011/0113288 A1* | 5/2011 | Ramakrishnan | G06F 11/3684 714/38.1 |
| 2016/0239407 A1* | 8/2016 | Ivancic | G06F 11/3604 |
| 2023/0376283 A1 | 11/2023 | Ardman et al. | |
| 2023/0376855 A1 | 11/2023 | Lange et al. | |
| 2023/0385042 A1 | 11/2023 | Obando Chacon et al. | |

FOREIGN PATENT DOCUMENTS

| | | | | |
|---|---|---|---|---|
| CN | 101986281 B | * | 7/2012 | |
| CN | 114091383 A | * | 2/2022 | G06F 30/33 |

* cited by examiner

*Primary Examiner* — Ryan D. Coyer
(74) *Attorney, Agent, or Firm* — BainwoodHuang

(57) ABSTRACT

Techniques for generating a test case involve: acquiring a first set of coding sequences representing a first set of test cases selected from a test case set for product testing. A test element in a test case of the test case set is coded based on the position of the test element in the element hierarchy of the test case set. The techniques further involve: generating a second set of coding sequences by performing a random variation related to at least one test element with respect to the first set of coding sequences; and generating a second set of test cases based on the second set of coding sequences. Accordingly, product testing and development may be automated, and the case set may change dynamically in a way that is adapted to product development while significantly reducing the overhead of designing and reviewing test cases throughout the product life cycle.

17 Claims, 5 Drawing Sheets

METHOD, DEVICE, AND COMPUTER PROGRAM PRODUCT FOR GENERATING TEST CASE

CROSS-REFERENCE TO RELATED APPLICATION

This application claims priority to Chinese Patent Application No. CN202211288156.5, on file at the China National Intellectual Property Administration (CNIPA), having a filing date of Oct. 20, 2022, and having "METHOD, DEVICE AND COMPUTER PROGRAM PRODUCT FOR GENERATING TEST CASE" as a title, the contents and teachings of which are herein incorporated by reference in their entirety.

TECHNICAL FIELD

Embodiments of the present disclosure relate to the field of computers, and more particularly, to a method, a device, and a computer program product for generating a test case.

BACKGROUND

In the testing of large and complex products, the design of test cases requires consideration of a plurality of aspects such as product functions, hardware platforms, and network conditions. In addition, test cases need to be dynamically updated with the changes of product functions, and integration and interaction of functions always need to be taken into consideration. The number of test points may grow exponentially with the addition of new functions. Due to these characteristics of system testing, it is challenging to construct test cases throughout the product life cycle that make optimal use of available resources to achieve a desired test coverage.

SUMMARY OF THE INVENTION

The embodiments of the present disclosure provide a solution for generating a test case.

In a first aspect of the present disclosure, a method for generating a test case is provided, the method including: acquiring a first set of coding sequences representing a first set of test cases, wherein the first set of test cases are selected from a test case set for product testing, and a test element in a test case of the test case set is coded based on the position of the test element in the element hierarchy of the test case set; generating a second set of coding sequences by performing a random variation related to at least one test element with respect to the first set of coding sequences; and generating a second set of test cases based on the second set of coding sequences.

In a second aspect of the present disclosure, an electronic device is provided that includes a processor and a memory coupled to the processor, wherein the memory has instructions stored therein which, when executed by the processor, cause the device to perform actions including: acquiring a first set of coding sequences representing a first set of test cases, wherein the first set of test cases are selected from a test case set for product testing, and a test element in a test case of the test case set is coded based on the position of the test element in the element hierarchy of the test case set; generating a second set of coding sequences by performing a random variation related to at least one test element with respect to the first set of coding sequences; and generating a second set of test cases based on the second set of coding sequences.

In a third aspect of the present disclosure, a computer program product is provided. The computer program product is tangibly stored on a computer-readable medium and includes machine-executable instructions, wherein the machine-executable instructions, when executed, cause a machine to execute the method according to the first aspect of the present disclosure.

It should be noted that the Summary of the Invention part is provided to introduce a selection of concepts in a simplified manner, which will be further described in the Detailed Description below. The Summary of the Invention part is neither intended to identify key features or major features of content of the present disclosure, nor intended to limit the scope of the content of the present disclosure.

BRIEF DESCRIPTION OF THE DRAWINGS

By further detailed description of example embodiments of the present disclosure with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

Figure 1:
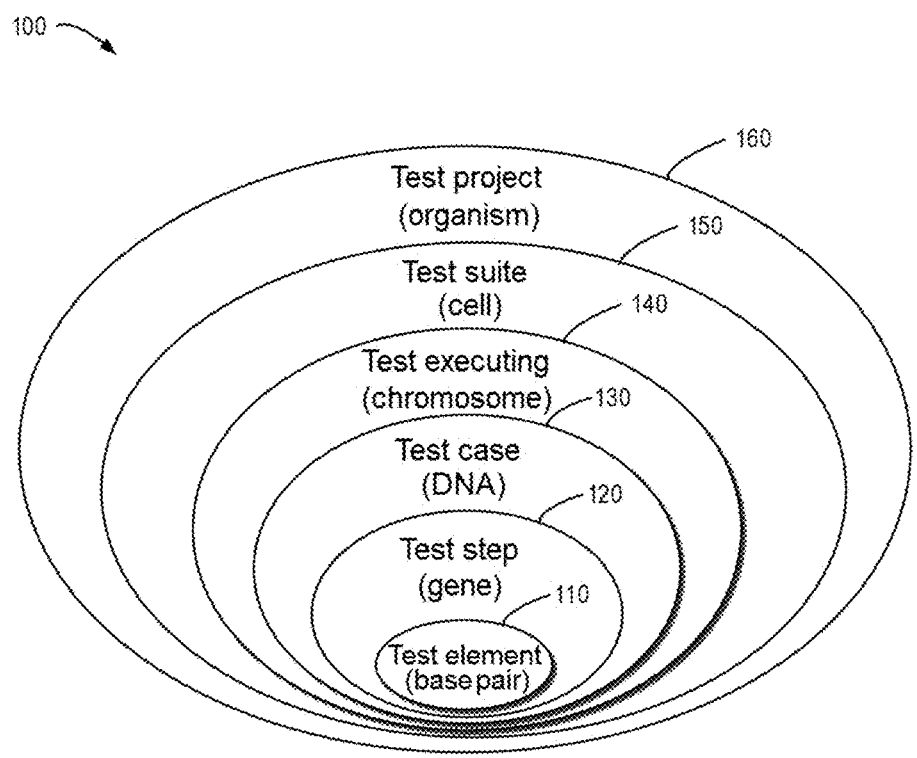
FIG. 1 illustrates a schematic diagram of the inclusion relationships of various units in a test project according to some embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the accompanying drawings show some embodiments of the present disclosure, it should be understood that the present disclosure can be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

In the testing of large and complex products, test cases require consideration of a plurality of aspects and need to be dynamically updated with the changes of product functions. This poses a challenge to the constructing of test cases that make optimal use of available resources to achieve a desired test coverage. Conventional test case design relies heavily on the experience of test engineers. Due to the complexity and dynamic characteristics of a product, test cases often require a tremendous amount of work, and their effectiveness cannot be guaranteed. Some other system testing theories focus on specific case design approaches and ignore the dynamic evolution of test objects. This makes test cases often lag behind changes in product development, resulting in some problems in a product not being exposed in time. In addition, the test case pool may become bloated over time due to the lack of an efficient and cost effective process for reviewing and iterating through test cases.

To at least partially address the above and other potential problems, embodiments of the present disclosure propose a solution for generating a test case, wherein this solution achieves automatic generation and updating of test cases based on genetic theory. In this solution, a test case is coded as a genetic sequence for test elements. On this basis, this solution selects one or more test cases from a test case set and randomly changes test elements in a coding sequence for the one or more test cases based on a gene variation approach such as mutation and recombination, so as to generate a new coding sequence. This solution can then generate new test cases based on the new coding sequence.

Further, based on the natural selection principle, some embodiments of the present disclosure may select, from the generated cases, cases that can be successfully run and can meet the performance requirements to be added to the case set, and continue to perform evolution iterations of the cases with respect to the updated case set. During the iteration process, new test elements may be introduced by variations, and new cases may be introduced into the case set individually, thus allowing new characteristics of a product to be included in the test scope of the case set.

With the solution of the present disclosure, changes and iterations of test cases can be transformed into changes and iterations of coding sequences that are easily executed by machines, thereby automating the evolution of test cases with product development, which can ensure that the case set for product testing changes dynamically in a way that is adapted to product development while significantly reducing the overhead of designing and reviewing test cases throughout the life cycle of a product.

FIG. 1 illustrates schematic diagram 100 of the inclusion relationships of various units in a test project according to some embodiments of the present disclosure. Schematic diagram 100 also illustrates example correspondences of these units to units in the genetic theory.

The genetic theory provides the basis for understanding how genes enable parents to transmit traits to their offspring. Individual genes and the entire genome change over time. Most of the changes that occur in genes undergo natural selection. Heritable changes occur randomly by chance, and if an organism with such changes is better able to survive and reproduce, it will survive the evolution.

The above characteristics of the genetic theory have some similarity with the regression and dynamic changes in test cases over the life cycle of a product (e.g., a software product). A test case may usually be a set of commands that accomplish a fixed operation according to a designer's plan. On the one hand, test cases may be re-run accurately as provided by the test plan so as to conduct regression, which makes them have computational characteristics. On the other hand, good test cases should explore more problems in a product, which requires adjusting the test cases during the development process to ensure the quality of the test project, thus making the test cases have biological-like characteristics. These two features can be analogous to the characteristics of genes. Further, units in the genetic theory and their algebraic relationships can be used to analogize the units in the test project.

As shown by reference numeral 110, a test element is the smallest unit in a test case. A test element may be the smallest set of features of a particular behavior or configuration, including fixed unit operations (e.g., insertion or removal) or special hardware or software configuration attributes (e.g., platform type). A test element may, for example, correspond to a base pair that is the basic chemical component of DNA in the genetic theory.

As shown by reference numeral 120, test elements may constitute a test step. Test steps are the basic components of project testing, and each test step can verify a specific internal logic of a product. Different test steps may have different types, numbers, and orders of test elements. A test step may, for example, correspond to a gene in the genetic theory. Genes are genetic units that are passed from parents to offspring and are used to determine certain characteristics of the offspring. Genes consist of base pairs. Different genes have different types, numbers, and orders of base pairs.

As shown by reference numeral 130, a test case may include a set of test steps for verifying a product behavior, including a sequence of test steps and how to perform the test steps. The test case may, for example, correspond to DNA in the genetic theory. DNA is the genetic material of humans and almost all other organisms. DNA consists of base pairs. Genes are valid DNA fragments. Different DNAs have different numbers and sequences of genes.

As shown by reference numeral 140, test executing is a dynamic process of executing the test cases, which also involves the development and operations (DevOps) and tools used to execute the test cases. Test executing may, for example, correspond to chromosomes serving as DNA carriers in the genetic theory.

As shown by reference numeral 150, a test suite may include a set of test cases that can be used to verify a feature aspect of the product and the corresponding supporting environment. The test suite may correspond to a cell. Cells are the smallest units that can survive independently and constitute all organisms capable of performing a bodily function, such as liver cells, heart cells, etc.

As shown by reference numeral 160, a test project is the collection of all test suites used in the product verification process, and also includes all internal and external resources, e.g., manpower, duration, etc. The test project may correspond to an organism serving as the material structure of an individual life form.

By analogizing various units in the test project to units in the genetic theory, embodiments of the present disclosure can imitate genetic evolution to update and iterate test cases for product testing, as described in more detail below.

Figure 2:
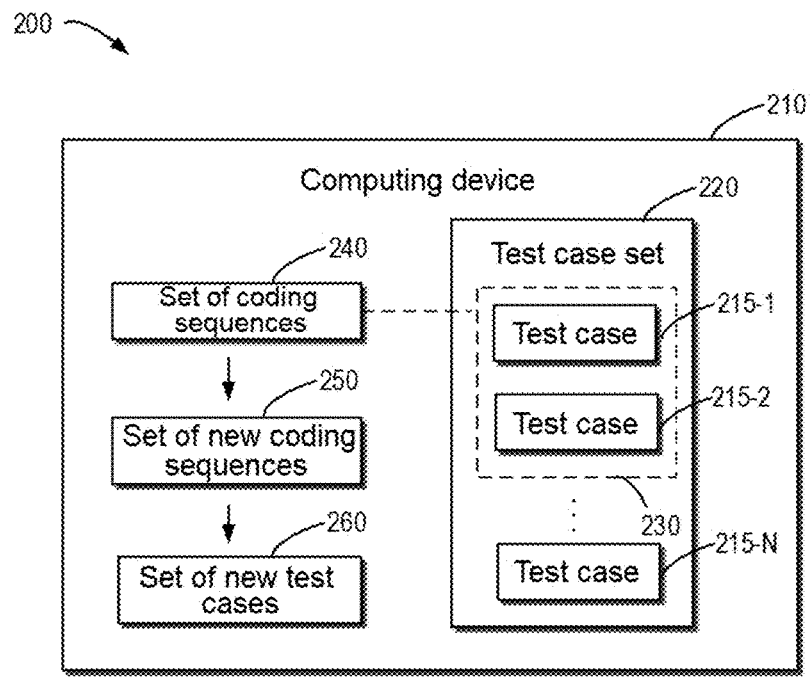
FIG. 2 illustrates a schematic diagram of an example environment in which a plurality of embodiments of the present disclosure can be implemented.

FIG. 2 illustrates a schematic diagram of example environment 200 in which a plurality of embodiments of the present disclosure can be implemented. Environment 200 may include computing device 210. Examples of computing devices 210 include, but are not limited to, a desktop computer, a smartphone, a tablet, a laptop, and a server. The scope of the present disclosure is not limited in this regard. In addition, although illustrated as a single device, computing device 210 may also be a plurality of devices, a virtual device, or any other form of devices suitable for implementing embodiments of the present disclosure.

Computing device 210 may store test case set 220 for product testing, where test case set 220 includes a plurality of test cases 215-1, 215-2, . . . , and 215-N. The computing device may perform various operations related to the test cases, for example, according to the method of the embodiments of the present disclosure. For example, computing device 210 may acquire a set of coding sequences 240 for a set of test cases 230 in a test case set, where each coding sequence corresponds to a test case. Computing device 210 may further generate a set of new coding sequences 250 from the set of coding sequences 240. Computing device 260 may further generate a set of new test cases 260 based on the set of new coding sequences 250. It should be understood that although, for illustrative purposes, FIG. 2 illustrates the set of test cases 230 as including two cases, i.e., test case 215-1 and test case 215-2, the set of test cases on which computing device 210 is based to perform the above operations may also include fewer (e.g., one case) or more cases.

In addition, computing device 210 may further add or remove a test case to or from test case set 220. For example, the computing device may run and evaluate test cases in the generated set of new test cases 260 and select and add part of them to the test cases.

The architecture and functions of example environment 200 are described for illustrative purposes only, and do not imply any limitation to the scope of the present disclosure. There may also be other devices, systems, or components that are not shown in example environment 200. For example, a collection of coding sequences for test cases in the test case set may also be stored on computing device 210. Furthermore, the embodiments of the present disclosure may also be applied to other environments having different structures and/or functions. For example, test case set 220 may also be stored outside of computing device 210.

Figure 3:
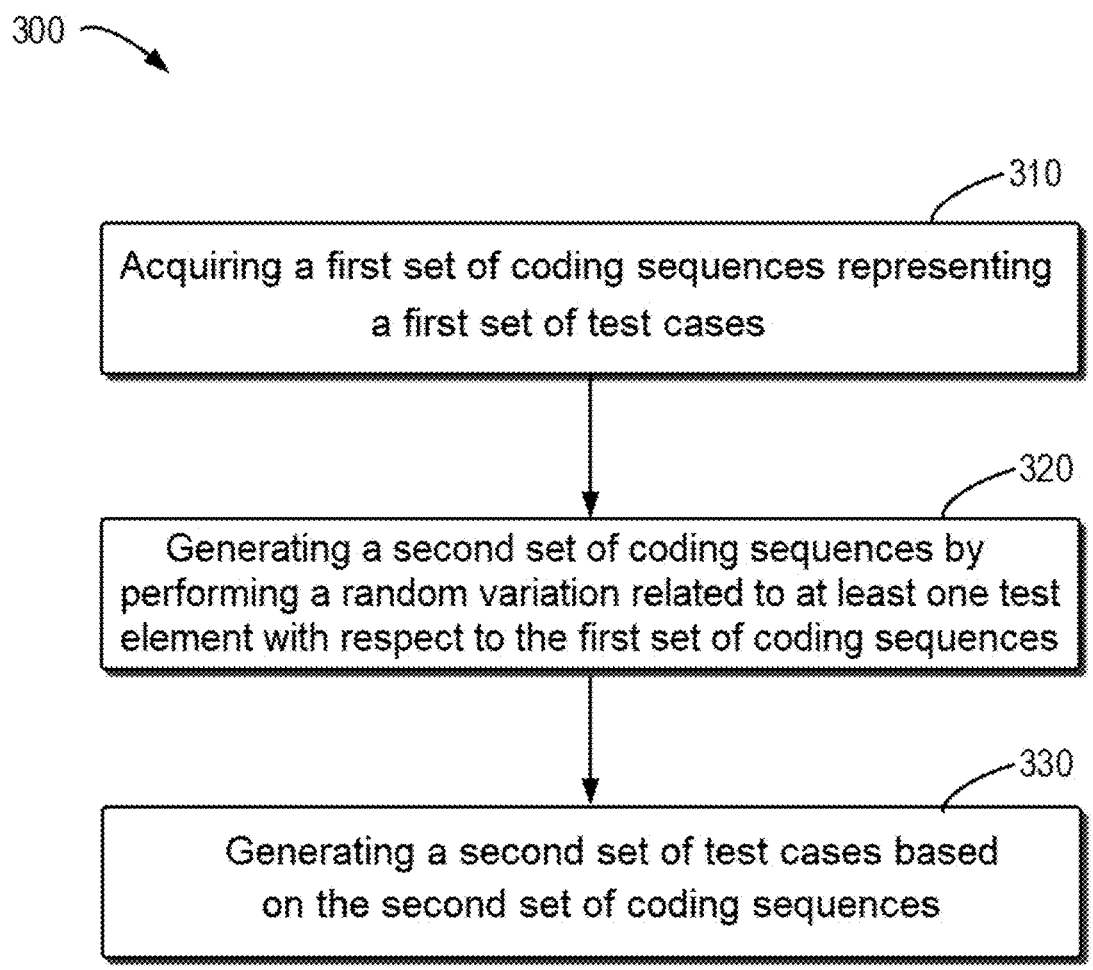
FIG. 3 illustrates a flow chart of an example method for generating a test case according to some embodiments of the present disclosure.

FIG. 3 illustrates a flow chart of example method 300 for generating a test case according to some embodiments of the present disclosure. Example method 300 may be performed, for example, by device 210 shown in FIG. 3. It should be understood that method 300 may also include additional actions not shown, and the scope of the present disclosure is not limited in this regard. Method 300 is described in detail below in conjunction with example environment 200 of FIG. 2.

At block 310, a first set of coding sequences representing a first set of test cases are acquired, wherein the first set of test cases are selected from a test case set for product testing. A test element in a test case of the test case set is coded into a coding sequence based on the position of the test element in the element hierarchy of the test case set. For example, computing device 210 may acquire coding sequences for one or more cases selected from test case set 220 (e.g., a set of coding sequences 240 for a set of test cases 230).

In some embodiments, computing device 210 may select a set of test cases from the test case set for use in operation. For example, computing device 210 may extract test cases according to the ID of the test case set based on some probability distribution (e.g., initially based on a uniform distribution).

Similar to DNA in the genetic theory, the coding sequence for a test case includes a plurality of test elements. And in some embodiments, the coding sequence for a test case may also include more levels. The coding sequence for a test case will be described in more detail later in connection with FIGS. 4 and 5.

At block 320, a second set of coding sequences are generated by performing a random variation related to at least one test element with respect to the first set of coding sequences. For example, computing device 210 may generate the set of new coding sequences 250 by performing a random variation related to at least one test element with respect to the set of coding sequences 240. The first set of coding sequences selected for the variation operation may include one or more coding sequences (e.g., two coding sequences for a pair of test cases).

To perform the random variation related to the at least one test element with respect to the coding sequences, computing device 210 may imitate mutations of base pairs to randomly change the test elements in the coding sequences. In some embodiments, computing device 210 may cause variation of one coding sequence by replacing at least one test element of the coding sequence with at least one other test element. In some embodiments, computing device 210 may remove at least one test element from one coding sequence to cause variation of the coding sequence. In some embodiments, computing device 210 may insert at least one test element into one coding sequence to cause variation of the coding sequence. In some embodiments, computing device 210 may perform a variety of the preceding changes with respect to the coding sequence to cause variation of the coding sequence.

In some embodiments, what computing device 210 uses for replacement or insertion may be a test element that already exists in the test case set. In some other embodiments, for example, when new test elements need to be introduced for new characteristics of a product, the computing device may also replace or insert the new test elements into the coding sequence for the test case by means of variation (e.g., by providing variety).

In some embodiments where the coding sequence for a test case has more levels, computing device 210 may also perform variation operations at different levels of the coding sequence, and performing variation operations at different levels of the coding sequence will be described in more detail later in connection with FIG. 5 and FIG. 6.

At block 330, a second set of test cases are generated based on the second set of coding sequences. For example, the computing device may generate a set of new test cases 260 based on the set of new coding sequences 250. For example, computing device 210 may utilize a code generation tool to generate a test case in a computer-executable code and/or computer-executable file format.

By using method 300, changes to test cases can be transformed into changes to the coding sequence of a test tuple, thus generating new cases from the existing test set in a simple and automated manner by taking advantage of the atomicity of test elements. This approach can be adapted flexibly to unused implementation environments and introduce new aspects that need to be tested into the test case set as a product evolves. Compared with conventional test case design, method 300 can significantly reduce the overhead of designing new test cases during the life cycle of a product.

Figure 4:
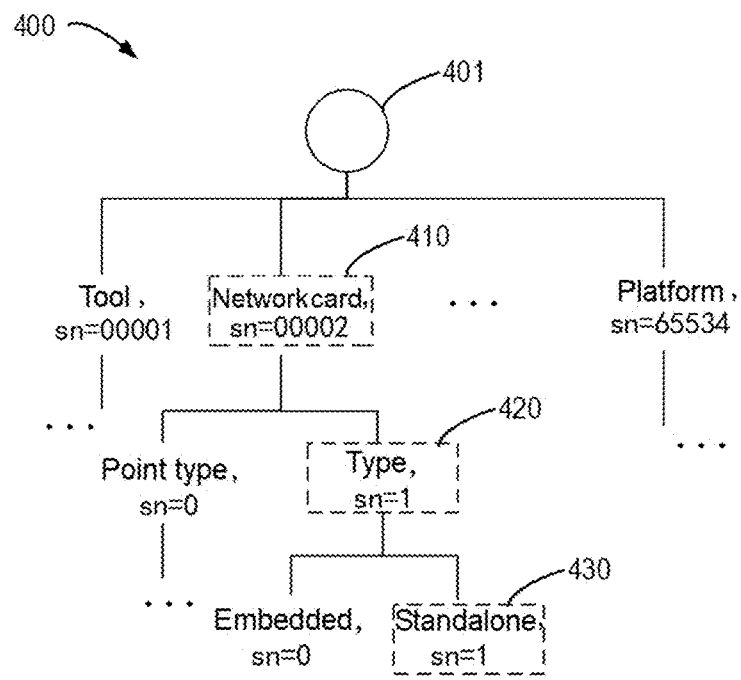
FIG. 4 illustrates an example element hierarchy of a test case set according to some embodiments of the present disclosure.

To construct a coding sequence for a test case, computing device 210 may first code test elements that serve as base units of the case based on the element hierarchy of the test case set. FIG. 4 illustrates part of example element hierarchy 400 of a test case set according to some embodiments of the present disclosure.

In element hierarchy 400, each node defines a test element in the test case set that represents a particular configuration attribute or operation. Some nodes may further nestedly include their own attributes or operations, and leaf nodes in the hierarchy represent indivisible atomic attributes or operations (for example, leaf node 430 in this example represents a specific network card type). It should be understood that the structure and specific nodes of element hierarchy 400 are shown as examples only, and that different test case sets may have different element hierarchies and different test elements.

Computing device 210 may code test elements based on, for example, the element hierarchy of FIG. 4. An example coding approach for a test element is described below in connection with FIG. 4. In this coding approach, computing device 210 first assigns sequence numbers (e.g., incremental numbering from 1) to first-level nodes under root node 401 that represents the entry of the element hierarchy.

Then, for a target test element to be coded, computing device 210 uses the first N bits to code the sequence number of the first-level node to which that test element belongs and uses the N bits as the name portion of the test element. N may be determined based on the scale of the element hierarchy of a specific test case set.

Further, computing device 210 uses Maxim(K) bits following the name portion to code the location of that test element under the first-level node to which it belongs and uses these bits as the content portion of that test element. Maxim(K) indicates the maximum tree depth of a test element partition tree corresponding to the first-level nodes. Since different test elements have different depths, using the maximum depth allows the code of each test element to have the same length, thus facilitating subsequent calculations.

On this basis, computing device 210 codes the serial number of the node to which the test element belongs at each level under the first-level node into the bits of the content portion from top to bottom, and fills the excess content bits with zeros.

As an example, the sequence number of first-level node 410 under root node 401 in FIG. 4 is shown as "00002," and the test element corresponding to node 430 can be coded as shown in Table 1, where the first five bits are coded with the sequence number of first-level node 410.

TABLE 1

| 0 | 0 | 0 | 0 | 2 | 1 | 1 | 0 | ... | 0 |

In FIG. 4, node 420 to which node 430 belongs is the node numbered 2 under node 410, so the first bit (i.e., the sixth bit from the left) of code of the content portion of test element 430 in Table 1 is "1." At the next level, node 430 is the node numbered 1 under node 420, so the second bit of code of the content portion in Table 1 is "1." At this point, the coding of the test element corresponding to node 430 has been completed, so the rest of the bits in the content portion are filled with zeros.

In a subsequent phase, by parsing the codes of the test elements in the coding sequence, computing device 210 can locate the coded test elements in the element hierarchy, thereby further restoring the test case according to the coding sequence.

In some embodiments, computing device 210 may connect coded adjacent test elements of a test case with relationship indicators, thereby constructing a coding sequence for the test case. The relationship indicators indicate dependency relationships between the connected adjacent test elements. For example, a relationship indicator may be a Boolean value (either 1 or 0) to reflect whether there exists a dependency relationship (e.g., the connected two test elements need to co-exist). In some other examples, a relationship indicator may also have other deformations. For example, there may be more than two possible values for a relationship indicator to indicate more types of dependency relationships.

In some embodiments, the coding sequence for the test case may have more levels. FIG. 5 illustrates logical schematic diagram 500 of an example data structure of a coding sequence for a test case according to some embodiments of the present disclosure, where the coding sequence has a plurality of levels that imitate the gene sequence. For example, computing device 210 of FIG. 2 may use this data structure to construct a coding sequence for a test case. FIG. 5 will be described below in connection with FIG. 2.

As shown by reference numeral 510, in the data structure shown in schematic diagram 500, a test case identified by a case ID includes a coding sequence of test steps. The coding sequence of test steps reflects the order relationship between test cases.

Algebraically, the coding of the test case may be defined as follows:

$$G_{Ts}=[g_{s1},g_{s2},g_{s3} \ldots g_{si}] \; (i=1,2,3 \ldots n) \quad (1)$$

where $G_{Ts}$ denotes the coding of the test case, and $g_{si}$ denotes the i-th test step of that test case. It should be understood that for each test case, the steps may be either serial or in parallel, wherein the serial steps, when executed, need to wait for the previous steps to finish; whereas the parallel steps may only mean the order in which the code is arranged or starts to execute, and the executed step does not have to wait for the previous step to finish. The two types of test cases can both evolve with steps as units after being converted into coding sequences, as will be described in more detail later.

As shown by reference numeral 520, the sequence of test steps is coded with a plurality of test steps for that test case. The code segment corresponding to each test step stores the actual operation of that test step. Further, as shown by reference numeral 530, the code segment for each test step corresponds to a subsequence of test elements. In this example, each subsequence corresponding to a test step includes a plurality of test elements, wherein the test elements are connected to each other by dependency bits that serve as relationship indicators as previously described (e.g., dependency bit 535). A dependency bit indicates a dependency relationship between the connected test elements.

Ultimately, as shown by reference numeral 540, each test element is coded such that its code includes a name portion and a content portion of the test element. Computing device 210 may code the test element in a manner as previously described with respect to FIG. 4, which will not be repeated herein.

Figure 5:
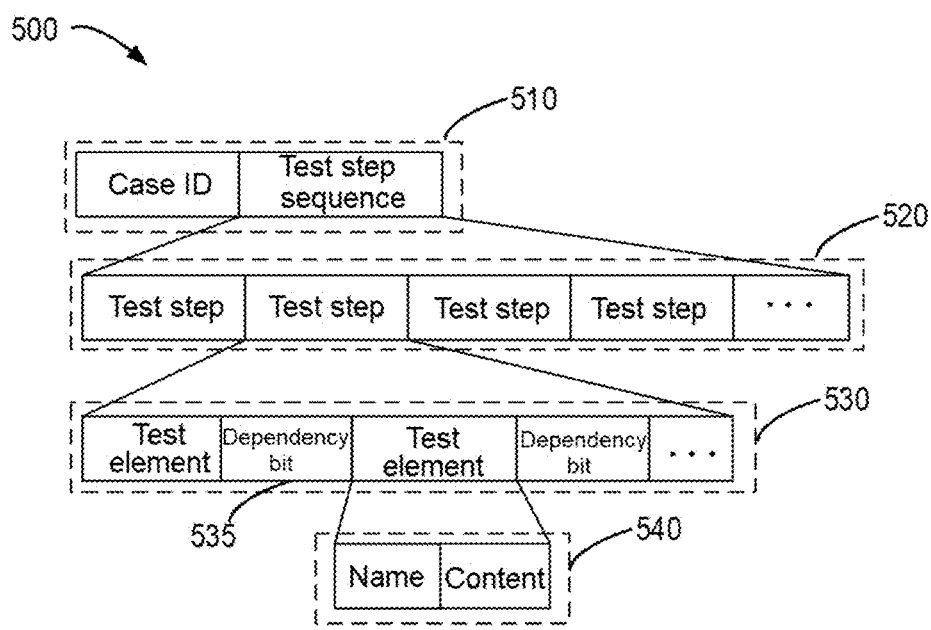
FIG. 5 illustrates a logical schematic diagram of an example data structure of a coding sequence for a test case according to some embodiments of the present disclosure.

According to the data structure of FIG. 5, the test case may be implemented as a coding sequence that facilitates computation and operation by computing device 210, which provides the basis for case generation and iteration of the present disclosure. It should be understood that the coding structure shown in FIG. 5 is intended as an example only, and in a particular implementation, various adjustments can be made to the contents of the coding sequence, such as adding various auxiliary identifiers, without departing from the structural principles of the coding sequence in the present disclosure.

Constructing a coding sequence for a test case as having a plurality of levels can enable the computing device to imitate the variation of a gene at multiple levels in order to perform the variation of the test case at the plurality of levels. For example, at the test element level, computing device 210 may insert, remove, or replace test elements in the coding sequence as described previously with respect to block 320 (i.e., by inserting, removing, or replacing codes for the test elements).

Further, in some embodiments, by using relationship indicators to connect test elements, computing device 210 may also take into consideration the dependency relationships between the test elements when performing a variation related to the test elements. In some such embodiments, computing device 210 performing a variation related to test elements may include replacing one set of contiguous test elements in a coding sequence with another set of contiguous test elements. In this set of contiguous test elements, a relationship indicator for each pair of adjacent test elements indicates that a dependency relationship exists between the pair of adjacent test elements (for example, the Boolean value of the dependency bit is true, or its value indicates that a certain type of relationship exists between the connected test elements).

In this way, unusable cases generated due to incompatibility between test elements can be reduced when generating new test cases. For example, if several combinations of specific test elements need to be present or absent at the same time to make a test case run successfully, then these elements are coded as interdependent. On this basis, these elements may be replaced together when performing a variation related to the test elements.

In some embodiments, at the test step level, computing device 210 may imitate the recombination of genes and perform a random variation on the test elements in a test step as a whole. In such embodiment, computing device 210 may select a pair of test cases from a test case set (e.g., test case set 220) as parents and acquire a pair of coding sequences for the parents. Computing device 210 may then select a set of test element subsequences corresponding to one or more test steps from each parent based on some random rule and exchange the two sets of subsequences with each other. In some embodiments, computing device 210 may initially select the code region at random based on a uniform distribution. Computing device 210 may also select based on an appropriate other random distribution or rule (e.g., as determined by the characteristics of a test project) a region to be recombined, and the embodiments of the present disclosure do not limit the specific rules for random selection.

Computing device 210 may select test steps in the same code region of the parents, i.e., the two sets of test steps are the steps that correspond to each other in the parental test cases. FIG. 6 illustrates schematic diagram 600 of an example variation related to a test element that can be performed by computing device 210 at the test step level according to some embodiments of the present disclosure.

As illustrated in schematic diagram 600, computing device 210 acquires test element sequences 610-1 and 610-2 for a pair of parental test cases. The subsequence corresponding to each test step is illustrated as a block in schematic diagram 600, for example, as shown in block 611.

Computing device 210 then selects the same test step regions 615-1 and 615-2 in the parent test cases, cuts subsequences of the selected test steps and crosses them with each other, and re-splices each of them into another coding sequence. As a result, computing device 210 may generate coding sequences 620-1 and 620-2 for two child test cases. As seen from schematic diagram 600, test step region 615-2 has been crossed into coding sequence 620-1, and test step region 615-1 has been crossed into coding sequence 620-2.

The child coding sequences 620-1 and 620-2 generated in this example may then be further used to generate code for the test case for execution, evaluation, etc. It should be understood that the crossing operation in schematic diagram 600 is intended as an example only, and that other forms of crossing may exist. For example, computing device 210 may perform multi-point crossing. For example, two corresponding crossing regions do not necessarily include strictly the same number of test steps.

Performing a variation related to a test element at multiple levels of coding can allow for a more diverse evolution of a test case, thus generating more potentially useful new cases with differentiated functions (e.g., the ability to detect different problems) from existing test cases.

Figure 7:
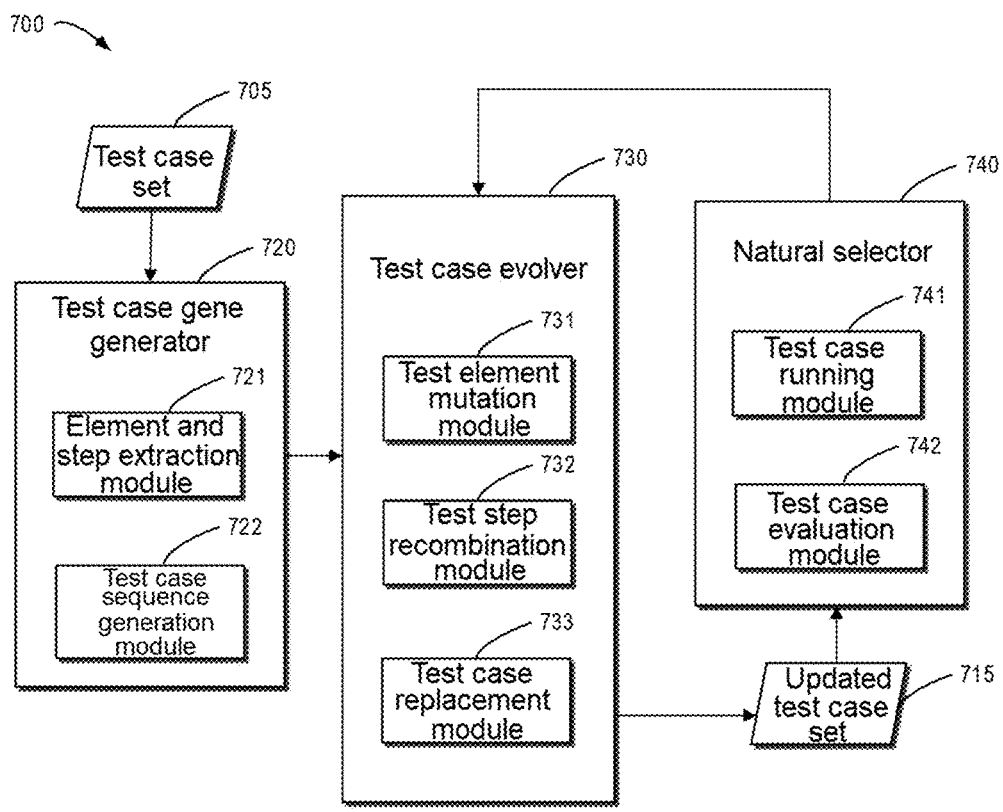
FIG. 7 illustrates an example architecture for self-evolution of a test case set according to some embodiments of the present disclosure.

On the basis of generating new test cases according to embodiments of the present disclosure, computing device 210 can imitate the natural selection mechanism and select, from the generated new cases, test cases that can be retained in the test case set, thereby achieving self-evolution of the test case set. FIG. 7 illustrates example architecture 700 for self-evolution of a test case set according to some embodiments of the present disclosure. For example, example architecture 700 may be included in computing device 210 and used by computing device 210 to perform various method actions Example architecture 700 includes test case gene generator 720, test case evolver 730, and natural selector 740. Test case gene generator 720 is used to generate a coding sequence for a test case and includes element and step extraction module 721 and test case sequence generation module 722.

Element and step extraction module 721 is used to extract test elements and test steps from the test case (e.g., from test case set 705) and to generate sequence codes for the test elements (e.g., in the manner described previously with respect to FIG. 4). On this basis, test case sequence generation module 722 is used to generate a coding sequence for a test element (e.g., according to the example data structure shown previously with respect to FIG. 5). In some embodiments, test case sequence generation module 722 may implement the coding sequence into a binary format that is easy to operate by a machine.

Test case evolver 730 is used to perform a variation related to a test element with respect to the coding sequence for the test case, thereby achieving the evolution of the test case. Test case evolver 730 includes three modules that can perform variation operations at three levels, respectively, as described below.

Test element mutation module 731 performs variation operations at the test element level, including addition and removal of test elements, and replacement of test elements with other test elements, as described previously with respect to block 320. This can result in new test steps and introduce new test elements to the test case set.

Figure 6:
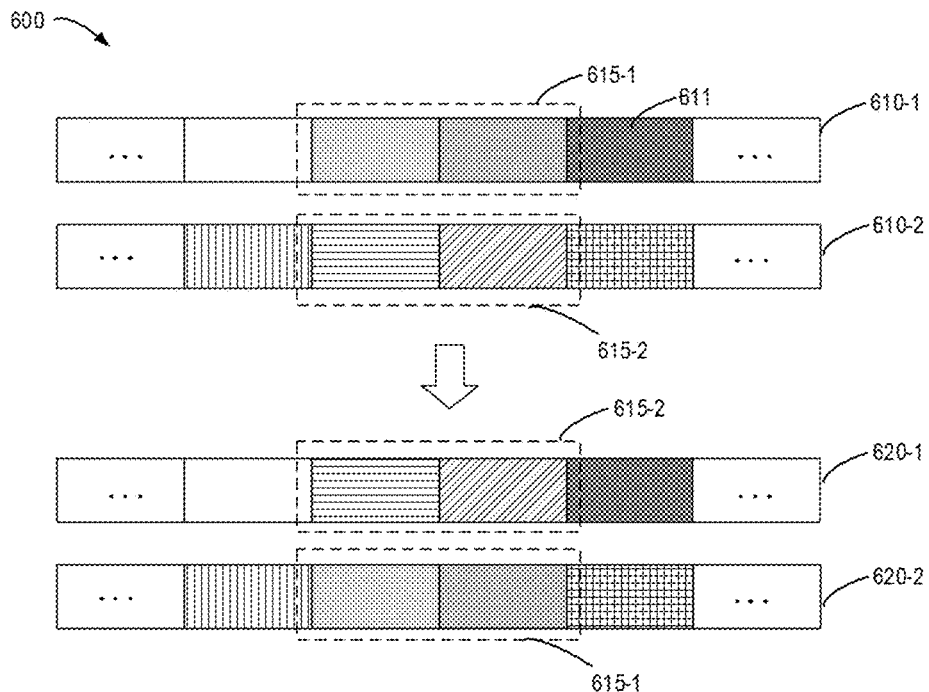
FIG. 6 illustrates an example schematic diagram of a variation at a test step level according to some embodiments of the present disclosure.

Test step recombination module 732 performs variation operations at the test step level, including cutting, crossing, and splicing for steps in the parent coding sequence, as previously described with respect to FIG. 6. This can recombine some of the steps of the parent test case to produce a new child test case.

In some embodiments, computing device 210 may also use test case replacement module 733 to add another test case to the test case set. This allows the test cases to be updated as a whole such that when, for example, there is a major update to a product, new base test cases can be introduced for further evolution. Similarly, computing device 210 may also remove test cases from the test case set at some moment.

Natural selector 740 is used to evaluate the availability and effectiveness of the test cases, such that the introduced and generated new test cases (e.g., new cases in updated test case set 715) having weak performance are naturally eliminated. Computing device 210 may use the natural selector to execute the newly generated test cases, and add the selected test cases to the test case set based on execution results of those test cases. Natural selector 740 includes test case running module 741 and test case evaluation module 742.

Test case running module 741 is used to check the executability of a test case. In some embodiments, test case running module 741 may convert a coding sequence for a test case into a case format suitable for its execution and execute that case. Test case running module 741 may exclude new test cases that are logically unsuccessful in execution. For example, if a new test case introduces a special operation on a dedicated hardware type, the test cannot be executed at all in the case where the dedicated hardware type does not exist in the actual environment. For example, if there are several steps in a new test case that conflict with each other, the test cannot be executed successfully either.

For new test cases for which results can be obtained from a test executed by test case running module 741, computing device 210 may collect execution result data to acquire respective performance measures for these test cases. Further, computing device 210 may use test case evaluation module 742 to evaluate the effectiveness of these test cases.

Based on the evaluation of the performance measures for the test cases, test case evaluation module 742 may select, from these new test cases, new test cases to be added to the test case set. For example, test case evaluation module 742 may use an automated testing tool to export fault (bug) data of the test cases. If the detected faults are test environment or framework issues that require script repair, these issues can be repaired, and test case running module 741 may retry to execute the relevant test cases. If the faults are indeed product issues, test case evaluation module 742 may further evaluate its quality (for example, whether additional unique product errors can be found).

In some embodiments, test case evaluation module 742 may select a set of performance measures as parameters and assign a weight to each measure. For example, the performance measures for the test cases may include, but are not limited to: a fault priority ratio, which reflects the importance of a fault found by a test case, and the higher the importance, the higher the value of that measure for the test case; a unique product fault ratio, which reflects unique faults found by a test case, and the more the unique faults found, the higher the value of that measure for the test case; and a product fault module distribution ratio, which reflects the distribution of the faults found by a test case in the product modules, and the more the product modules involved in the faults, the higher the value of that measure for the test case. To facilitate the calculation, test case evaluation module 742 can normalize the values of these performance measures.

On this basis, test case evaluation module 742 can use the following Equation (2) to calculate the effectiveness score of a particular test case:

$$T = \Sigma_{i=1}^{N} \omega_i \times I_i \qquad (2)$$

where T denotes the effectiveness score of the test case to be evaluated, and denotes the value of the ith measure of a set of N measures for that test case, where this set of N measures are used to calculate the effectiveness score. In addition, $\omega_i$ denotes the weight of that measure, and the sum of the weights of all measures is 1. In one example, the fault priority ratio and the unique product fault ratio may each be assigned a weight of 0.4, and the remaining measures such as the product fault module distribution ratio may be assigned a total weight of 0.2. According to Equation (2), efficient test cases that report high-importance faults, low repetition rate, and high coverage will receive a high effectiveness score.

The test case evaluation module may then select new test cases with effectiveness scores higher than a threshold (e.g., a preset watermark value) and add the selected ones to the test case set for use in product testing or the next round of evolution iteration of test cases, and discard the remaining new cases with low scores. It should be understood that the above calculation for selecting new test cases is only an example and can be adjusted and varied in various manners according to specific embodiments.

In some embodiments, different evolutionary and natural selection strategies can be applied by architecture 700 for different purposes. For example, when introducing test elements created for new product features, the focus may be on selecting test cases that find valid product and new feature-related faults. For example, when the test project has reached a certain scale, it is possible to focus on selecting test cases that are not repetitive and have a more detailed strategy. For example, when testing time is limited, it is possible to focus on selecting test cases that can improve the coverage of test elements. For example, when a product has entered the mature stage, unbiased random evolution of current test cases can be beneficial for exposing new faults in edge situations.

By using architecture 700, computing device 210 can convert an initial test case set for a test target (e.g., a test case set that includes steps such as drive faults, fault insertion, and IO testing and is intended to improve fault insertion through drive operations) into a coding sequence, and use test case evolver 730 and natural selector 740 on this basis to perform evolution iterations of the test case set. The iteration process may be triggered, for example, based on each test cycle or at a fixed duration. In each round of iteration, for the selected test cases, test case evolver 730 may perform one or more corresponding random variations at each of all or some of the aforementioned plurality of levels, thereby generating new cases. Natural selector 740 may then determine whether the generated cases are retained in the test case set. A plurality of rounds of iterations may be executed, and the entire evolution process can be completed when a preset condition is met. For example, this condition may be that no new executable tests are generated, or that the effectiveness score of a new case is below a specific value. In this way, self-evolution of the test case set can be achieved, thus significantly reducing the human and other resources required to develop new cases.

Figure 8:
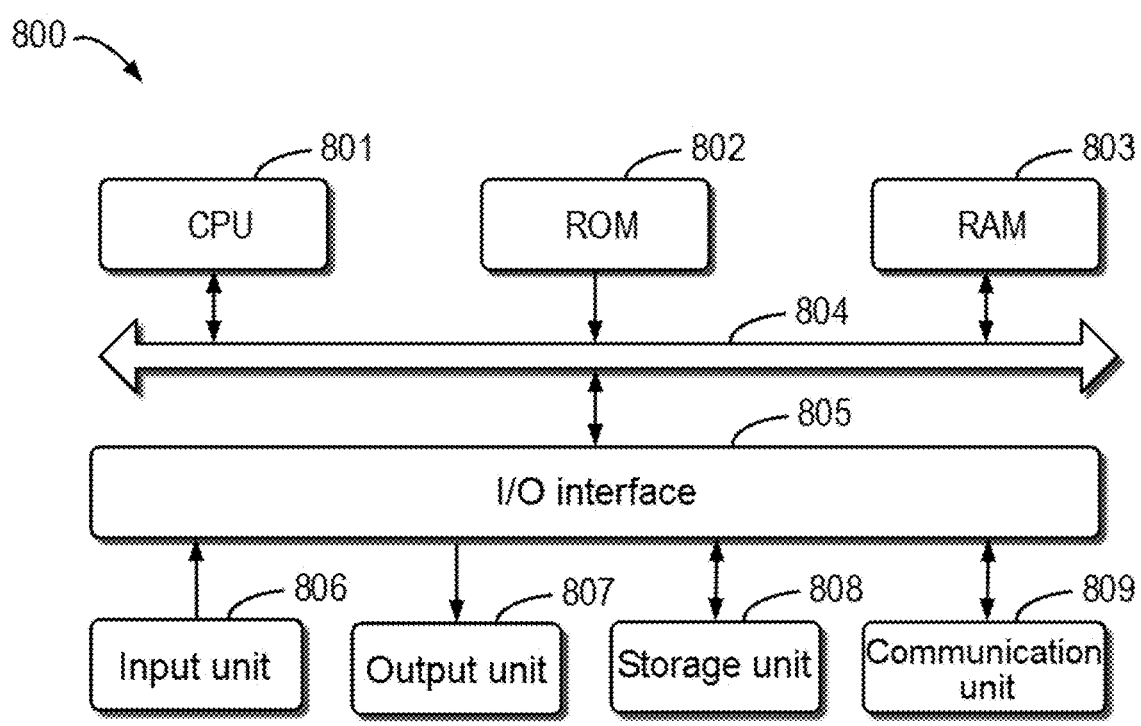
FIG. 8 illustrates a schematic block diagram of a device that can be used to implement embodiments of the present disclosure.

FIG. 8 illustrates a schematic block diagram of device 800 that may be used to implement embodiments of the present disclosure. Device 800 may be the device or apparatus (e.g., computing device 210) described in the embodiments of the present disclosure. As shown in FIG. 8, device 800 includes Central Processing Unit (CPU) 801, which may execute various appropriate actions and processing in accordance with computer program instructions stored in Read-Only Memory (ROM) 802 or computer program instructions loaded onto Random Access Memory (RAM) 803 from storage unit 808. Various programs and data required for the operation of device 800 may also be stored in RAM 803. CPU 801, ROM 802, and RAM 803 are connected to each other through bus 804. Input/Output (I/O) interface 805 is also connected to bus 804. Although not shown in FIG. 8, device 800 may also include a co-processor.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various methods or processes described above may be performed by processing unit 801. For example, in some embodiments, the method may be embodied as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, such that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the various embodiments disclosed herein.

The invention claimed is:

1. A method for generating a test case, comprising:
    acquiring a first set of coding sequences representing a first set of test cases, wherein the first set of test cases are selected from a test case set for product testing, and a test element in a test case of the test case set is coded into a coding sequence based on the position of the test element in an element hierarchy of the test case set in which each node defines a corresponding test element;
    generating a second set of coding sequences by performing a random variation related to at least one test element with respect to the first set of coding sequences, wherein performing the random variation related to at least one test element comprises removing the at least one test element from the first set of coding sequences and replacing the at least one test element in the first set of coding sequences with at least one other test element, and wherein the at least one other test element comprises a test element already existing in the test case set; and
    generating a second set of test cases based on the second set of coding sequences.

2. The method according to claim 1, further comprising:
    constructing a coding sequence for a test case by connecting coded adjacent test elements of the test case with relationship indicators, wherein the relationship indicators indicate dependency relationships between the connected adjacent test elements.

3. The method according to claim 2, wherein performing the random variation related to the at least one test element comprises:
    replacing one set of contiguous test elements in the first set of coding sequences with another set of contiguous test elements, wherein the relationship indicator connecting each pair of adjacent test elements in the set of contiguous test elements indicates that a dependency relationship exists between the corresponding pair of adjacent test elements.

4. The method according to claim 1, further comprising:
    constructing a coding sequence for a test case such that the coding sequence comprises a plurality of subsequences for test elements, the subsequences of the plurality of subsequences corresponding to test steps of the test case.

5. The method according to claim 4, wherein the first set of coding sequences comprise a first coding sequence for a first test case and a second coding sequence for a second test case, and performing a random variation related to at least one test element comprises:
    exchanging a first set of subsequences in the first coding sequence and a second set of subsequences in the second coding sequence, wherein the first set of subsequences correspond to a first set of test steps and the second set of subsequences correspond to a second set of test steps, the second set of test steps being corresponding test steps of the first set of test steps in the second test case.

6. The method according to claim 1, further comprising:
    executing the second set of test cases;
    determining, based on execution results of the second set of test cases, test cases in the second set of test cases that should be added to the test case set; and
    adding the determined cases to the case set.

7. The method according to claim 6, wherein determining test cases that should be added to the test case set comprises:
    acquiring respective performance measures for test cases in the second set of test cases that can be successfully executed; and
    determining, based on the performance measures, the test cases that should be added to the test set.

8. The method according to claim 1, further comprising updating the test case set by at least one of the following:
    adding another test case to the test case set; or
    removing a test case from the test case set.

9. An electronic device, comprising:
    a processor; and
    a memory coupled to the processor, wherein the memory has instructions stored therein which, when executed by the processor, cause the device to execute actions comprising:

acquiring a first set of coding sequences representing a first set of test cases, wherein the first set of test cases are selected from a test case set for product testing, and a test element in a test case of the test case set is coded into a coding sequence based on the position of the test element in an element hierarchy of the test case set in which each node defines a corresponding test element;

generating a second set of coding sequences by performing a random variation related to at least one test element with respect to the first set of coding sequences, wherein performing the random variation related to at least one test element comprises removing the at least one test element from the first set of coding sequences and replacing the at least one test element in the first set of coding sequences with at least one other test element, and wherein the at least one other test element comprises a test element already existing in the test case set; and generating a second set of test cases based on the second set of coding sequences.

10. The device according to claim 9, wherein the actions further comprise:

constructing a coding sequence for a test case by connecting coded adjacent test elements of the test case with relationship indicators, wherein the relationship indicators indicate dependency relationships between the connected adjacent test elements.

11. The device according to claim 10, wherein performing the random variation related to the at least one test element comprises:

replacing one set of contiguous test elements in the first set of coding sequences with another set of contiguous test elements, wherein the relationship indicator connecting each pair of adjacent test elements in the set of contiguous test elements indicates that a dependency relationship exists between the corresponding pair of adjacent test elements.

12. The device according to claim 9, wherein the actions further comprise:

constructing a coding sequence for a test case such that the coding sequence comprises a plurality of subsequences for test elements, the subsequences of the plurality of subsequences corresponding to test steps of the test case.

13. The device according to claim 12, wherein the first set of coding sequences comprise a first coding sequence for a first test case and a second coding sequence for a second test case, and performing a random variation related to at least one test element comprises:

exchanging a first set of subsequences in the first coding sequence and a second set of subsequences in the second coding sequence, wherein the first set of subsequences correspond to a first set of test steps and the second set of subsequences correspond to a second set of test steps, the second set of test steps being corresponding test steps of the first set of test steps in the second test case.

14. The device according to claim 9, wherein the actions further comprise:

executing the second set of test cases;

determining, based on execution results of the second set of test cases, test cases in the second set of test cases that should be added to the test case set; and adding the determined cases to the case set.

15. The device according to claim 14, wherein determining test cases that should be added to the test case set comprises:

acquiring respective performance measures for test cases in the second set of test cases that can be successfully executed; and determining, based on the performance measures, the test cases that should be added to the test set.

16. The device according to claim 9, wherein the actions further comprise updating the test case set by at least one of the following:

adding another test case to the test case set; or removing a test case from the test case set.

17. A computer program product having a non-transitory computer readable medium which stores a set of instructions to generate a test case; the set of instructions, when carried out by computerized circuitry, causing the computerized circuitry to perform a method of:

acquiring a first set of coding sequences representing a first set of test cases, wherein the first set of test cases are selected from a test case set for product testing, and a test element in a test case of the test case set is coded into a coding sequence based on the position of the test element in an element hierarchy of the test case set in which each node defines a corresponding test element;

generating a second set of coding sequences by performing a random variation related to at least one test element with respect to the first set of coding sequences, wherein performing the random variation related to at least one test element comprises removing the at least one test element from the first set of coding sequences and replacing the at least one test element in the first set of coding sequences with at least one other test element, and wherein the at least one other test element comprises a test element already existing in the test case set; and generating a second set of test cases based on the second set of coding sequences.

* * * * *